US012710714B2

(12) United States Patent
Kaino et al.

(10) Patent No.: US 12,710,714 B2
(45) Date of Patent: Aug. 18, 2026

(54) IMAGE FORMING APPARATUS

(71) Applicant: CANON KABUSHIKI KAISHA, Tokyo (JP)

(72) Inventors: Toshiya Kaino, Shizuoka (JP); Shizuma Nishimura, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/068,964

(22) Filed: Mar. 3, 2025

(65) Prior Publication Data

US 2025/0291289 A1 Sep. 18, 2025

(30) Foreign Application Priority Data

Mar. 13, 2024 (JP) ................................ 2024-038810

(51) Int. Cl.
*G03G 15/20* (2006.01)

(52) U.S. Cl.
CPC ....... *G03G 15/205* (2013.01); *G03G 15/2064* (2013.01)

(58) Field of Classification Search
CPC .................................................... G03G 15/205
See application file for complete search history.

(56) References Cited

U.S. PATENT DOCUMENTS

2004/0105693 A1* 6/2004 Akizuki ............. G03G 15/2039 399/69
2012/0148273 A1* 6/2012 Shimura ............ G03G 15/2039 399/33
2019/0235420 A1* 8/2019 Mochizuki ......... G03G 15/5004
2024/0053696 A1* 2/2024 Haematsu .......... G03G 15/2064

FOREIGN PATENT DOCUMENTS

JP 2019028188 A 2/2019

* cited by examiner

*Primary Examiner* — Carla J Therrien
(74) *Attorney, Agent, or Firm* — Canon U.S.A., Inc. IP Division

(57) ABSTRACT

Disclosed is an image forming apparatus that includes a fixing device including a fixing film, a heater disposed in the fixing film, a temperature detection unit configured to detect a temperature of the heater, and a pressure roller, a controller configured to control a rate of energizing the heater to raise the temperature detected by the temperature detection unit to a target temperature, and a storage unit configured to store temperature-rise time period information of the temperature detection unit. In use, the controller determines a temperature-rise time period of temperature detected by the temperature detection unit while energizing the heater at a predetermined energization rate, compares the determined temperature-rise time period with temperature-rise time period information, estimates maximum power to be supplied to the heater, and modifies, based on the estimated maximum power, the rate of energizing the heater.

18 Claims, 14 Drawing Sheets

FIG. 9

| Δt×100 | DETECTION POWER Pd |
|---|---|
| −26 | 675 W |
| −24 | 700 W |
| −22 | 725 W |
| −20 | 750 W |
| −18 | 775 W |
| −16 | 800 W |
| −14 | 825 W |
| −12 | 850 W |
| −10 | 875 W |
| −8 | 900 W |
| −6 | 925 W |
| −4 | 950 W |
| −2 | 975 W |
| 0 | 1000 W |
| 2 | 1025 W |
| 4 | 1050 W |
| 6 | 1075 W |
| 8 | 1100 W |
| 10 | 1125 W |
| 12 | 1150 W |
| 14 | 1175 W |
| 16 | 1200 W |
| 18 | 1225 W |
| 20 | 1250 W |
| 22 | 1275 W |
| 24 | 1300 W |
| 26 | 1325 W |

FIG. 13

| | | AC POWER SUPPLY VOLTAGE | | |
|---|---|---|---|---|
| | | 100 V | 110 V | 90 V |
| EMBODIMENT | DETECTION POWER Pd | 1000 W | 1225 W | 805 W |
| | ENERGIZATION-DUTY CORRECTION AMOUNT A | 1.00 | 0.82 | 1.24 |
| | DEFECTIVE FIXING | ○ | ○ | ○ |
| | HOT OFFSET | ○ | ○ | ○ |
| COMPARATIVE EXAMPLE | ENERGIZATION-DUTY CORRECTION AMOUNT A | 1.00 | 1.00 | 1.00 |
| | DEFECTIVE FIXING | ○ | × | × |
| | HOT OFFSET | ○ | × | ○ |

FIG. 14

| | INITIAL STAGE | 100,000 SHEETS | 200,000 SHEETS |
|---|---|---|---|
| THICKNESS OF FIXING-FILM RELEASE LAYER [μm] | 20 | 15 | 11 |
| NIP WIDTH [mm] | 9.0 | 9.4 | 9.6 |
| RESISTANCE [Ω] | 9.1 | 9.23 | 9.35 |
| AC VOLTAGE [V] | 100 | 100 | 100 |
| MAXIMUM POWER Pw [W] | 1013 | 998 | 986 |
| DETECTION POWER Pd [W] | 1015 | 1000 | 985 |

IMAGE FORMING APPARATUS

BACKGROUND

Field

The present disclosure relates to an image forming apparatus that forms an image on a recording material.

Description of the Related Art

An image forming apparatus includes a fixing device that fixes a toner image to a recording material, such as recording paper or an overhead transparency, after the toner image is transferred to the recording material through an image forming unit. Configurations of fixing devices include a film heating type that exhibits good quick start performance and excellent energy saving performance. In a fixing device of such a film heating type, a pressure roller is pressed against a fixing film located thereon for heating by a ceramic heater, a recording material bearing an unfixed toner image is nipped and conveyed by the fixing film and the pressure roller, and the toner image is heated and fixed to the recording material.

Methods for controlling a heater to a set temperature include typically used methods of controlling an energization time period during which electric power is supplied to the heater. Two types of methods, wave number control and phase control, are typically used to control the energization time period. Wave number control controls energization and de-energization at integer multiples of the frequency of the power supply waveform. Phase control controls a phase angle for energization every half cycle of the power supply waveform. In wave number control, the ratio of the number of waves for energization to the total number of waves per unit time is defined as the energization rate. In phase control, the ratio of the energization time period to the half cycle of the power supply waveform is defined as the energization rate. Controlling the energization rate can control a heater to a set temperature.

The resistances of individual heaters include tolerances. There are variations in voltage applied to individual heaters. As known, the resistance of a heater changes due to energization deterioration. If the heater is energized at the same energization rate, power may vary due to variations in resistance or voltage, or change in durability. It is therefore difficult to precisely control the temperature of the heater.

At a high heater temperature, an excessive quantity of heat may be applied to a recording material or toner, causing an image defect (hot offset). Hot offset refers to an image defect in which, under excessive heating conditions (hereinafter, “excessive fixing”), toner on a recording material adheres to a fixing film and the toner on the fixing film adheres to another recording material after one rotation of the fixing film. At a low heater temperature, an insufficient quantity of heat may cause defective fixing (cold offset). Cold offset refers to a phenomenon in which poor fixing causes a toner image on a recording material to be partly lost without being firmly fixed to the recording material.

To prevent such image defects, as discussed in Japanese Patent Laid-Open No. 2019-28188, a correction unit is provided so that the same amount of power can be outputted even if the resistance of a heater or a voltage applied to the heater varies. An image forming apparatus discussed in Japanese Patent Laid-Open No. 2019-28188 includes a voltage detection unit to detect an input voltage and a resistance storage unit storing a previously measured resistance of the heater. Maximum power that can be supplied to the heater is calculated based on the input voltage detected by the voltage detection unit and the resistance of the heater. Correcting the energization rate to output power in a range from the maximum power to predetermined power controls the temperature of the heater.

Like the apparatus discussed in Japanese Patent Laid-Open No. 2019-28188, an image forming apparatus including a voltage detection unit or a current detection unit for maximum power detection has higher cost. If a reduced cost apparatus lacks a voltage or current detection unit, maximum power may not be accurately detected. In this case, the energization rate cannot be accurately corrected because the energization rate is affected by, for example, variations in input voltage or resistance of the heater or a change in the resistance of the heater caused by energization deterioration. Therefore, the temperature of the heater may fail to be precisely controlled, causing hot offset or defective fixing.

SUMMARY

The present disclosure provides an image forming apparatus that reduces or eliminates an image defect resulting from hot offset or defective fixing.

The present disclosure provides an image forming apparatus including an image forming unit configured to form an image on a recording material and a fixing device configured to fix the image to the recording material. The fixing device includes a fixing member, a heating member configured to heat the fixing member, a temperature detection unit configured to detect a temperature of the heating member, and a pressure member facing the heating member with the fixing member interposed between the pressure member and the heating member. The image forming apparatus further includes a control unit configured to control a rate of energizing the heating member to raise the temperature detected by the temperature detection unit to a target temperature and a storage unit configured to store temperature-rise time period information of the temperature detection unit. The control unit is further configured to determine a temperature-rise time period of temperature detected by the temperature detection unit while energizing the heating member at a predetermined energization rate, compare the determined temperature-rise time period with temperature-rise time period information stored in the storage unit, estimate maximum power to be supplied to the heating member based on the compared information, and modify, based on the estimated maximum power, the rate of energizing the heating member. The energization rate is the rate of time during which the heating member is energized per unit time.

According to the present disclosure, an image defect resulting from hot offset or defective fixing can be reduced or eliminated.

Further features of the present disclosure will become apparent from the following description of exemplary embodiments with reference to the attached drawings.

BRIEF DESCRIPTION OF THE DRAWINGS

FIG. 9 illustrates a table of detection power.

FIG. 13 is a table illustrating the presence or absence of an image defect in the embodiment and a comparative example.

FIG. 14 is a table illustrating differences between detection power levels Pd and maximum power levels Pw under deterioration in durability in the embodiment.

DESCRIPTION OF THE EMBODIMENTS

One or more illustrative example embodiments of the present disclosure will be described below with reference to the drawings. It is to be understood that the dimensions, material, and shape of each of the components described in the embodiments and, for example, the relative arrangement of the components, should be appropriately changed depending on the configuration or various conditions of an apparatus to which the present disclosure is applied. In other words, the scope of the present disclosure is not intended to be limited to the following embodiments.

<Image Forming Apparatus>

Figure 1:
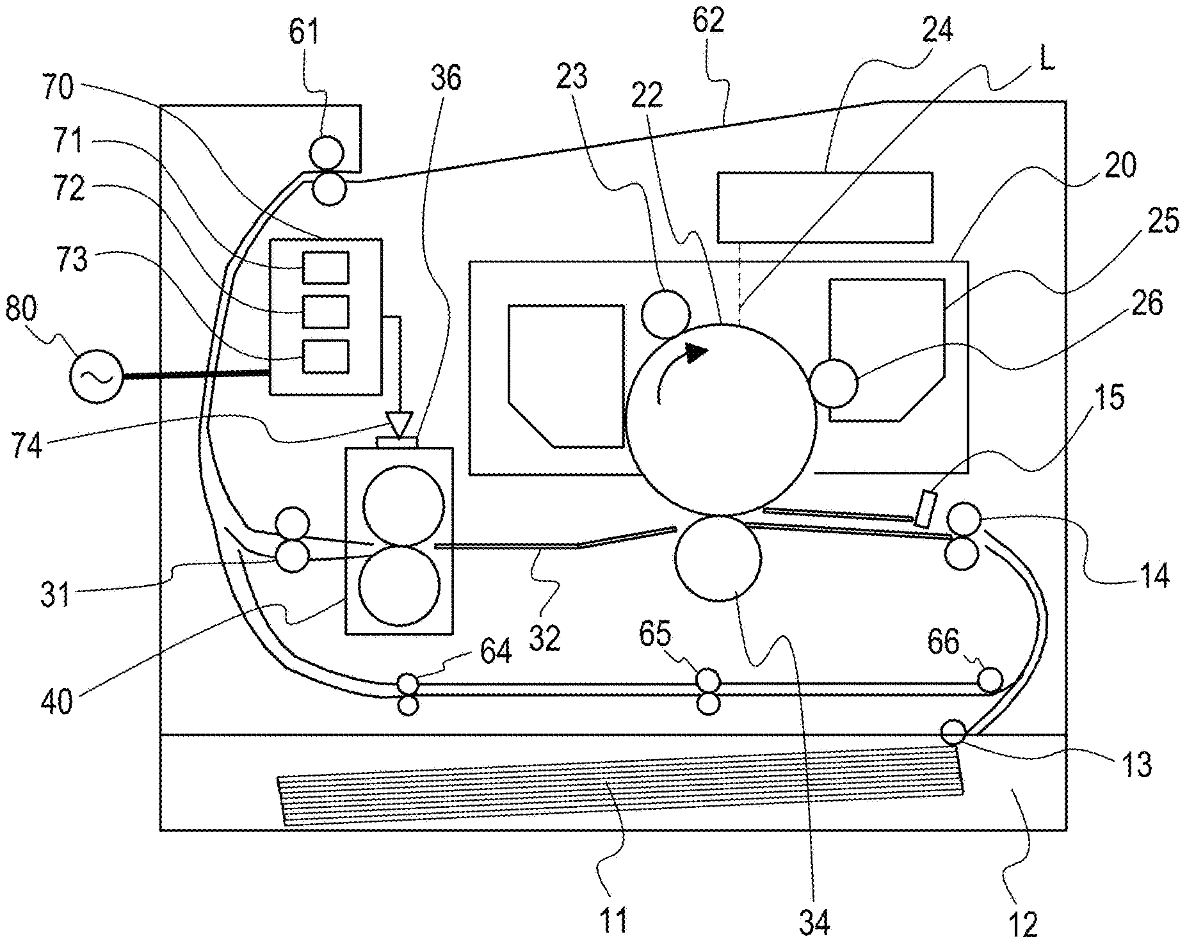
FIG. 1 is a cross-sectional view of a schematic configuration of an image forming apparatus.

The configuration of an image forming apparatus according to an embodiment will be described with reference to FIG. 1. The image forming apparatus of FIG. 1 is a black and white laser printer configured to form images on recording materials, or sheets, using electrophotography. An image forming unit 20 forms an electrostatic latent image with laser light L, develops the electrostatic latent image to form a toner image, and then transfers the toner image onto a recording material. The image forming apparatus includes a feed tray 12, a feeding roller 13, a registration roller pair 14, a registration sensor 15, and discharge rollers 61. The image forming unit 20 includes a photosensitive drum 22 as an image bearing member, a charging device 23 as a primary charging mechanism, a scanner unit 24 as an exposure device, a toner container 25, a developing device 26, and a transfer roller 34. A controller 70 controls operations of these components. The controller 70 also controls an operation of a heating device 40, which will be described later.

The photosensitive drum 22 includes an aluminum cylinder having an outer periphery coated with an organic photoconductive layer. The photosensitive drum 22 is rotated by a driving force transmitted from a drive motor. The drive motor rotates the photosensitive drum 22 clockwise for an image forming operation. The photosensitive drum 22 includes a hollow aluminum cylinder (φ30, thickness: 1.0 mm) having an outer periphery coated with an organic photoconductive layer (thickness: 60 μm).

The charging device 23 uniformly charges the surface of the photosensitive drum 22. The scanner unit 24 applies exposure light to the photosensitive drum 22 to selectively expose the surface of the photosensitive drum 22 to the light, thus forming an electrostatic latent image.

The developing device 26 includes a developing sleeve to visualize the electrostatic latent image and is disposed in the toner container 25. A power supply applies a developing bias between the developing sleeve 26 and the photosensitive drum 22 facing the developing sleeve 26. The photosensitive drum 22 is rotated clockwise during image formation. The developing sleeve 26 in the toner container 25 develops a toner image on the electrostatic latent image formed on the photosensitive drum 22.

A recording material 11 held in the feed tray 12 is conveyed by the feeding roller 13, reaches the registration roller pair 14, and is detected by the registration sensor 15. During image formation, the recording material 11 is conveyed based on the timing detected by the registration sensor 15 so that the recording material 11 coincides with the toner image on the photosensitive drum 22 when the toner image reaches the transfer roller 34.

The transfer roller 34 is a member facing the photosensitive drum 22 and being in contact therewith. The transfer roller 34 includes a metal core (φ6) and an elastic layer located on the metal core, having a thickness of 4 mm, and made of nitrile butadiene rubber (NBR) or hydrin rubber. The surface of the elastic layer has an axial length of 220 mm. The transfer roller 34 is brought into contact with the photosensitive drum 22 by a pressing mechanism. At this time, a contact pressure is 13 N. The width of contact between the transfer roller 34 and the photosensitive drum 22 is 2.0 mm. While the recording material 11 is nipped and conveyed by the transfer roller 34 and the photosensitive drum 22, the toner image on the photosensitive drum 22 is transferred to the recording material 11 by a transfer bias applied from the power supply.

A conveyance guide 32 is a guiding member to convey the recording material 11 from a transfer portion to the heating device 40.

The heating device 40, which is an example fixing device, heats and melts the toner image on the recording material 11 to fix the toner image to the recording material 11 while nipping and conveying the recording material 11. The recording material 11 subjected to a fixing process through the heating device 40 is conveyed via conveyance rollers 31 and is then discharged to an output tray 62 outside the image forming apparatus by the discharge rollers 61. Thus, the image forming operation is finished. For duplex printing, the recording material 11 subjected to the fixing process through the heating device 40 is conveyed to the discharge rollers 61 by the conveyance rollers 31. Then, the discharge rollers 61 are switched to reverse rotation, so that the recording material 11 is conveyed to duplex rollers 64 and 65 on a duplex conveyance path. The recording material 11 is conveyed from the duplex rollers 64 and 65 to a duplex refeeding roller 66 and then reaches the registration roller pair 14 again. An unprinted surface of the recording material 11 is similarly subjected to the above-described transfer and fixing processes, thus forming an image on the recording material 11. The recording material 11 is then discharged onto the output tray 62 by the conveyance rollers 31 and the discharge rollers 61. Thus, the image forming operation is finished.

The controller 70 includes a central processing unit (CPU) 71, a read-only memory (ROM) 72, and a random access memory (RAM) 73. The CPU 71 runs various programs stored in the ROM 72 to control various operations for image formation while using the RAM 73, which is a volatile memory, as a work area. The ROM 72 and the RAM 73 are example storage units storing information used to control the image forming apparatus. The ROM 72 is an example nonvolatile memory storing control programs for the image forming apparatus.

<Configuration of Heating Device>

Figure 2:
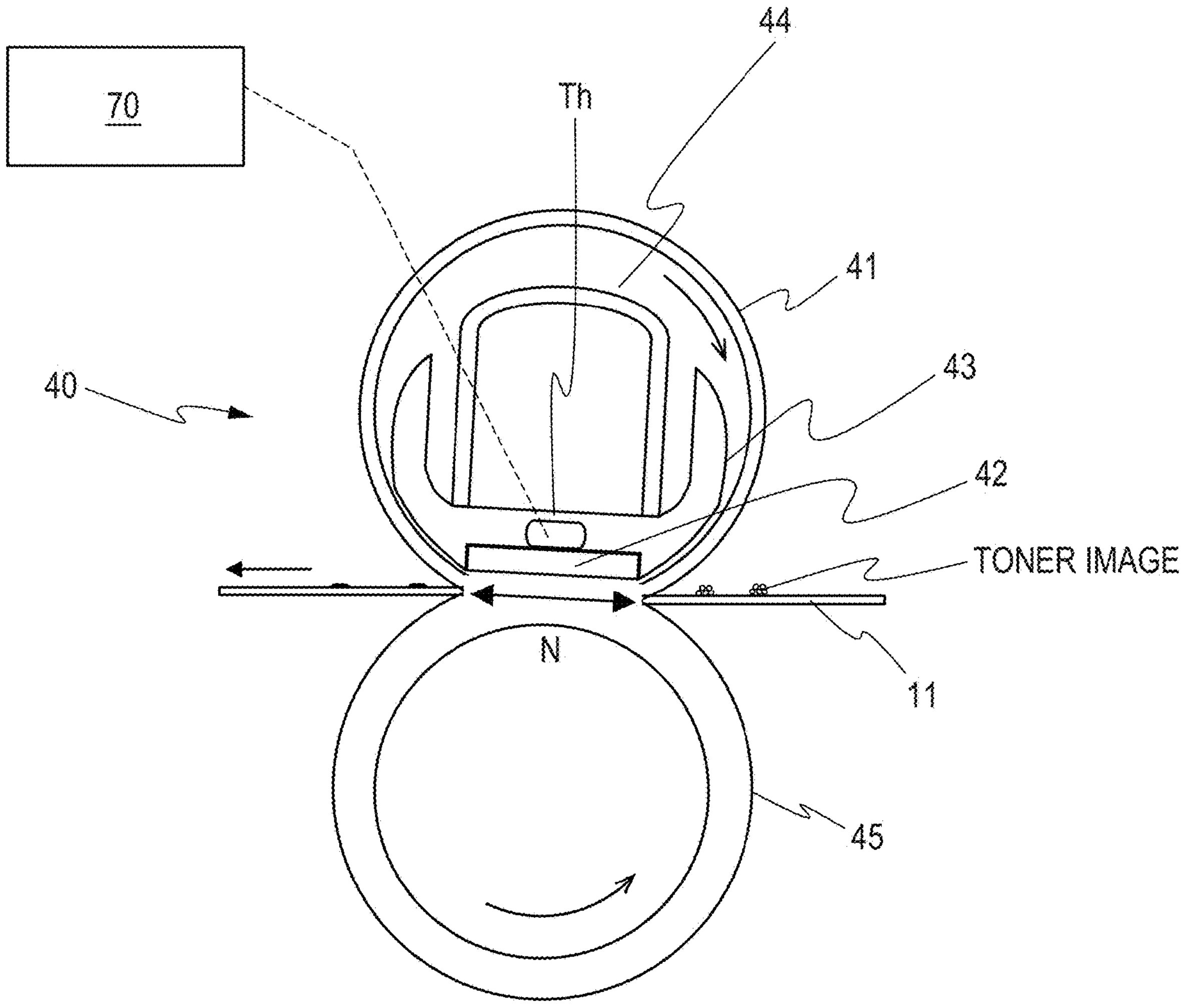
FIG. 2 is a cross-sectional view of a schematic configuration of a heating device.

The heating device 40 as an example fixing device will now be described with reference to FIG. 2. The heating device 40 includes a fixing film 41, serving as a fixing member, and a heater 42, serving as a heating member, in contact with an inner surface of the fixing film 41.

The heater 42, which is disposed in an internal space of the fixing film 41, is an example heating member that heats the fixing film 41 when energized. The heater 42 is held by a holding member 43.

The holding member 43 has a guiding function to guide rotation of the fixing film 41. A stay 44 applies a pressure from a pressure spring to the holding member 43 in a direction to a pressure roller 45 as a pressure member, thus forming a fixing nip portion N to heat and fix toner on the recording material 11. The stay 44 is made of highly rigid metal. The total pressure of the pressure spring is 250 N. The fixing nip portion N has a width of 9.0 mm in a recording material conveying direction. The pressure roller 45 has an end with a drive gear attached thereto. The pressure roller 45 receives power from a motor and thus rotates counterclockwise. The fixing film 41 is driven and rotated clockwise with rotation of the pressure roller 45. The recording material 11 bearing a toner image formed thereon is heated and subjected to the fixing process at the nip portion N while being nipped and conveyed in the direction of arrow.

The fixing film 41 is an example of a rotatable cylindrical fixing member. The fixing film 41 has an outside diameter of 24 mm. The fixing film 41 includes a base layer having a thickness of 70 μm and made of polyimide resin, an elastic layer located on an outer side of the base layer, having a thickness of 300 μm, and made of thermally conductive rubber, and a release layer, serving as an outermost layer, having a thickness of 20 μm and formed with a perfluoroalkoxyalkane (PFA) tube. Although the present embodiment describes the example in which the elastic layer is provided to improve fixability, the elastic layer may be omitted if there is no problem in fixability. The pressure roller 45 has an outside diameter of 25 mm. The pressure roller 45 includes an iron core having an outside diameter of 17 mm, an elastic layer having a thickness of 4 mm and made of silicone rubber, and a release layer, serving as an outermost layer, having a thickness of 40 μm and formed with a PFA tube.

Figure 3A:
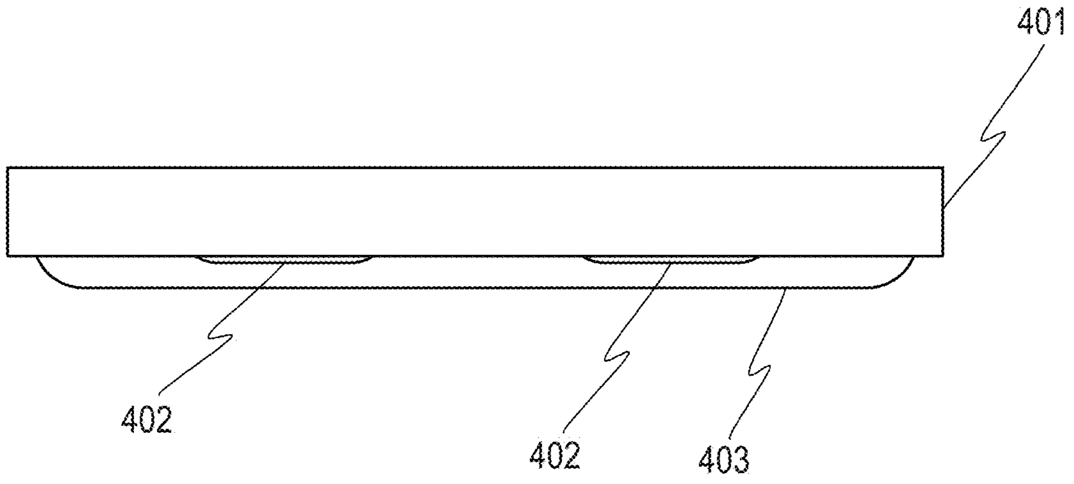
FIGS. 3A and 3B are schematic diagrams illustrating the configuration of a heater included in the heating device.
Figure 3B:
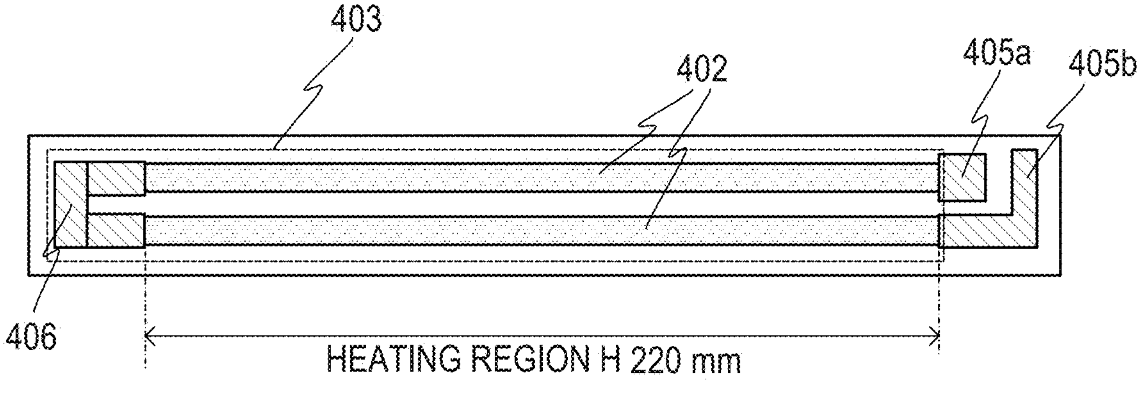

The configuration of the heater 42 will now be described with reference to FIGS. 3A and 3B. FIG. 3A is a cross-sectional view of the heater 42. The heater 42 includes a base 401. The base 401 is an alumina substrate, which is a ceramic substrate, elongated in a longitudinal direction and having a thickness of 1.0 mm. The base 401 has a length of 260 mm and a width (along a sheet passing direction) of 7.78 mm. The heater 42 has a front surface that is in contact with the fixing film 41. The heater 42 includes a resistance heating layer 402, which is an example resistance heating element, having a thickness of 10 μm and a protective glass plate 403 having a thickness of 60 μm on its front surface. The resistance heating layer 402 is formed by applying a conductive paste containing silver-palladium (Ag/Pd) alloy to the alumina substrate (base 401) in a screen-printing manner and baking the conductive paste.

The protective glass plate 403 is in contact with the fixing film 41 with fluorinated grease therebetween, and exhibits good sliding properties. FIG. 3B is a schematic diagram illustrating the front surface of the heater.

The resistance heating layer 402 is formed as a strip extending in the longitudinal direction. The protective glass plate 403, indicated by dotted lines in FIG. 3B, covers the resistance heating layer 402 and a conductor 406 to provide insulation. A heating region H, which is to be heated by the resistance heating layer 402, in the longitudinal direction has a length of 220 mm. The resistance heating layer 402 has a resistance of 9.22Ω. Although the base 401 of the heater 42 is made of ceramic in the embodiment as described above, the base 401 may be made of metal.

A fixing thermistor Th is disposed on a back surface of the heater 42. The fixing thermistor Th is an example temperature detection unit to detect the temperature of the front surface of the heater 42. The fixing thermistor Th is mounted in the middle of the heater 42 in a direction orthogonal to the recording material conveying direction.

In the heating device 40, power is supplied to electrode portions 405*a* and 405*b* of the heater 42 from the controller 70 connected to an alternating-current (AC) power supply 80, e.g. a power outlet. Thus, the resistance heating layer 402 of the heater 42 generates heat. The controller 70 controls energization of the heater 42 based on a detection signal indicating the temperature of the heater 42 outputted from the thermistor Th by using a triac included in the controller 70. Thus, the temperature of the heater 42 is controlled. If temperature information obtained based on the detection signal from the thermistor Th is lower than a control target temperature, the controller 70 increases power to be supplied to the heater 42. Conversely, if temperature information obtained based on the detection signal from the thermistor Th is higher than the control target temperature, the controller 70 reduces power to be supplied to the heater 42. Power is controlled by controlling an energization duty (energization rate), which will be described later.

As described above, the controller 70 controls power to be supplied to the heater 42 based on a detection signal from the thermistor Th to align the temperature of the heater 42 with the control target temperature. In the embodiment, the AC voltage at the AC power supply 80 is 100 V. A voltage drop due to power consumption by the components other than the heater 42 in the image forming apparatus is 4 V. Therefore, a voltage applied to the electrode portions of the heater 42 is 96 V. Because the heater 42 has a resistance of 9.22Ω, maximum power Pw that can be supplied to the heater 42 is 1000 W, which is given by using $W=V^2/R$.

Once the heating device 40 is mounted in the image forming apparatus, a contact connector 74 in the image forming apparatus is electrically connected to a memory chip 36, which is an example storage unit, disposed on a portion of the surface of the heating device. This connection allows communication with the memory chip 36. Reading information in the memory chip 36 into the RAM 73 of the controller 70 further improves image quality and maintenance of the heating device.

<Power Detection>

A power detection method will now be described. The embodiment will describe a method of comparing a temperature-rise time period determined in a production process with a temperature-rise time period determined in situ in a power detection sequence to estimate power to be supplied to the heater 42.

(1) Determination of Temperature-Rise Time Period in Production Process

Figure 4:
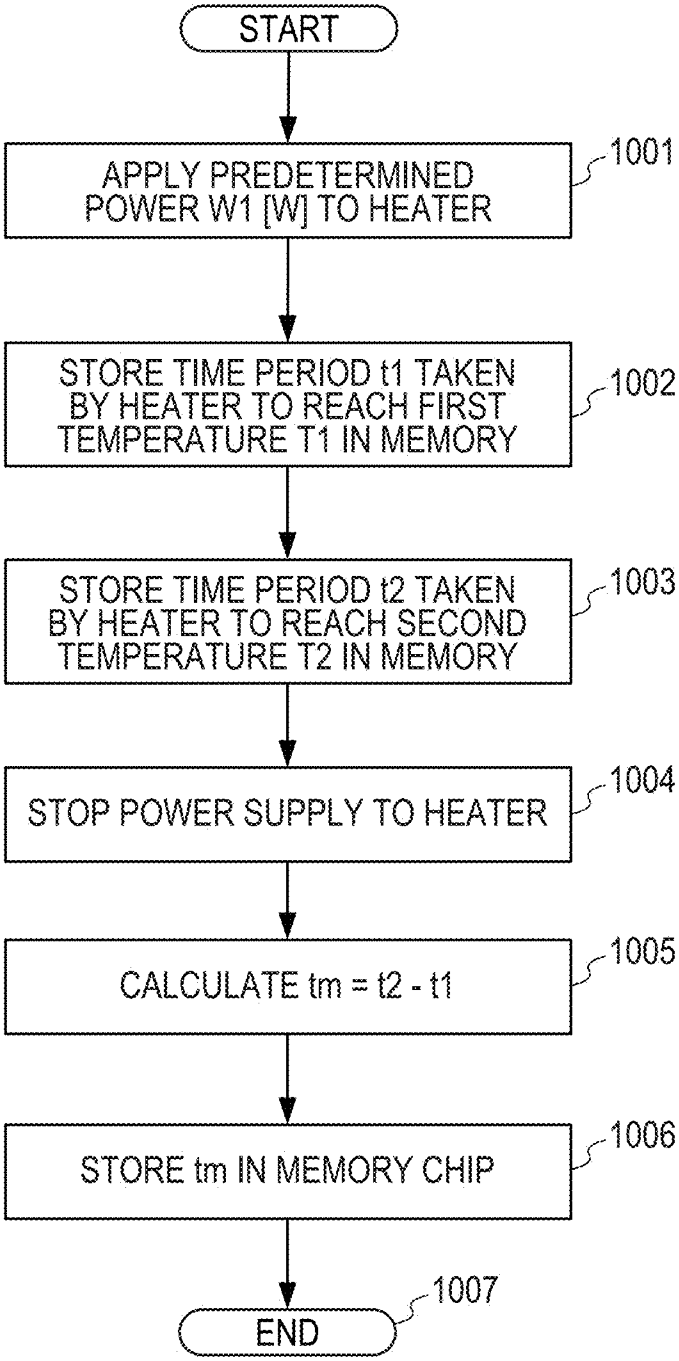
FIG. 4 is a flowchart of a method to determine a production temperature-rise time period.
Figure 5A:
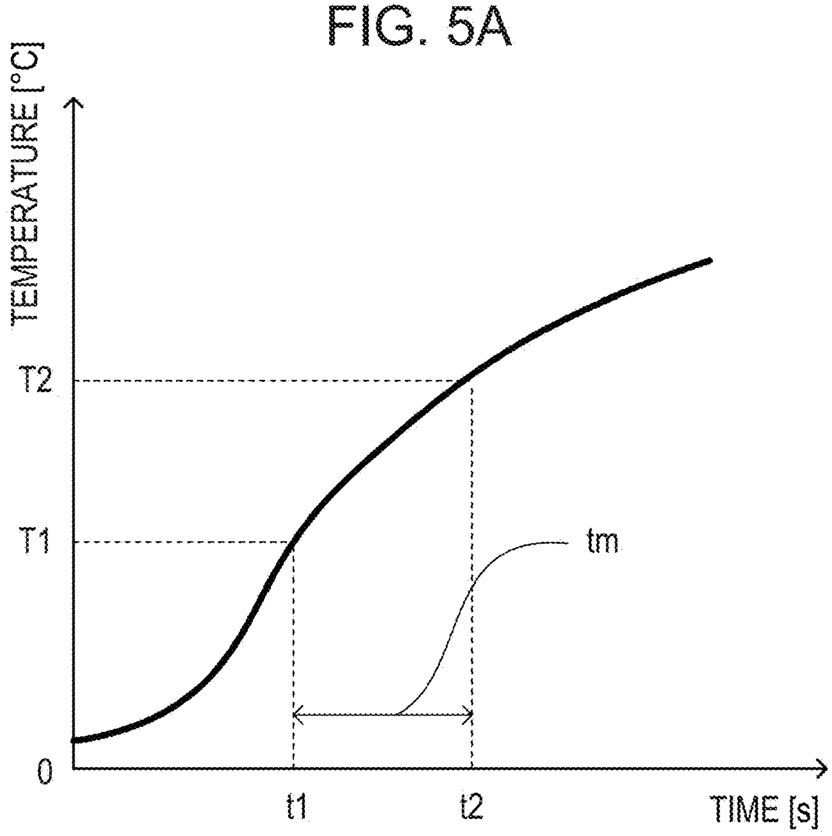
FIGS. 5A and 5B illustrate a temperature rise curve in the determination of the production temperature-rise time period and power corresponding to the temperature rise curve, respectively.
Figure 5B:
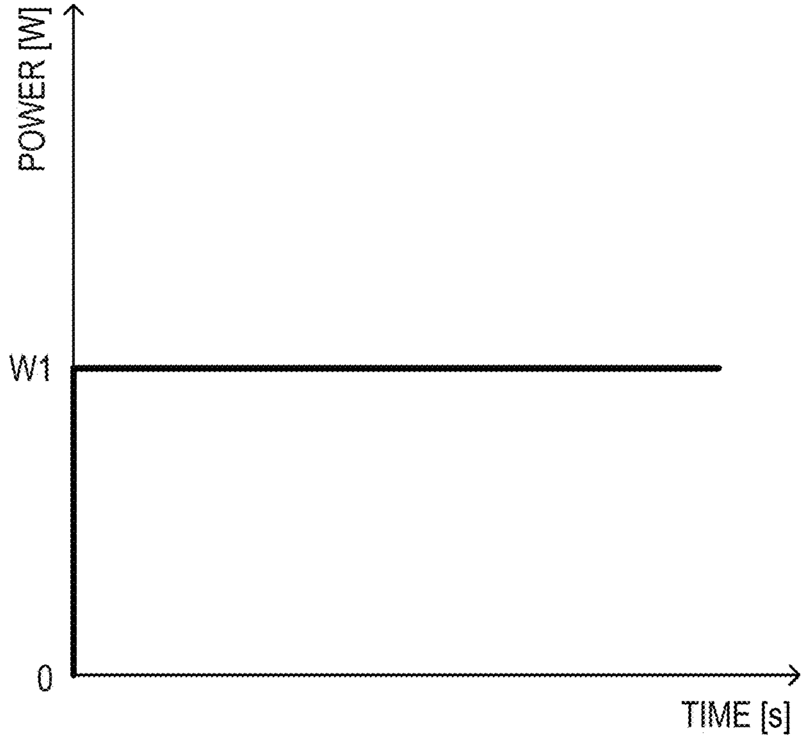
Figure 6:
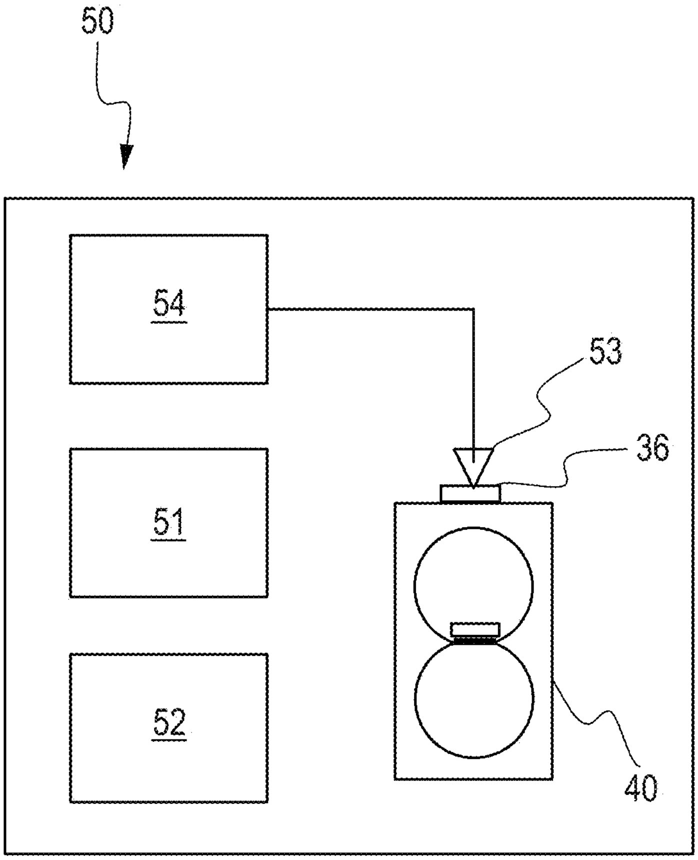
FIG. 6 is a schematic diagram of a temperature-rise measuring device.

Determination of a temperature-rise time period in the production process will be described with reference to FIGS. 4, 5A, and 5B. FIG. 4 is a flowchart of a method to determine a temperature-rise time period in the production process. FIG. 5A illustrates a temperature rise curve of the thermistor Th in the production process. FIG. 5B illustrates power supplied to the heater 42 corresponding to the temperature rise curve of FIG. 5A. The determination of a temperature-rise time period is performed during the process of assembling the heating device 40. A temperature-rise measuring device 50 (refer to FIG. 6) is connected to the heating device 40 to determine a temperature-rise time period. The temperature-rise measuring device 50 starts application of predetermined power W1 [Watts] to the heater 42 of the heating device 40, in Step 1001. At this time, while the pressure roller 45 is in a stopped state, the power is supplied to the heater 42 (stop-state heating). The heater 42 starts to rise in temperature in response to the power applied to the heater 42.

The temperature-rise measuring device 50 stores, in a memory 51, a time period t1 taken by the heater 42 to reach a first temperature T1 [° C.] for temperature-rise measurement after the start of power application, the time period t1 being measured based on detection signals from the thermistor Th, in Step 1002.

The temperature-rise measuring device 50 stores, in the memory 51, a time period t2 taken by the heater 42 to reach a second temperature T2 [° C.] for temperature-rise measurement that is higher than the first temperature T1 [° C.], the time period t2 being measured based on detection signals from the thermistor Th, in Step 1003. The power supply to the heater 42 is stopped after a temperature detected by the thermistor Th reaches the second temperature T2 [° C.], in Step 1004. The temperature-rise measuring device 50 causes a calculation unit 52 to calculate a production temperature-rise time period tm (=t1−t2) based on the time periods t1 and t2 stored in the memory 51, in Step 1005. The production temperature-rise time period tm is information indicating a time period from the time when the thermistor Th detected the temperature T1 [C] to the time when the thermistor Th detected the temperature T2 [C] during production of the fixing device. The temperature-rise measuring device 50 includes an electric contact 53 and a writing unit 54. The writing unit 54 is electrically connected to the memory chip 36 disposed on the surface of the heating device 40. The temperature-rise measuring device 50 writes the production temperature-rise time period tm multiplied by 100 in the memory chip 36 in Step 1006. The determination of the temperature-rise time period is terminated (1007). As described above, in the production process for individual heating devices 40, the production temperature-rise time period tm unique to each of the heating devices 40 at the predetermined power W1 [Watts] is stored in the corresponding memory chip 36. In the embodiment, the predetermined power W1 is set to 500 W, the first temperature T1 is set to 45° C., and the second temperature T2 is set to 65° C. In this case, the production temperature-rise time period tm is 0.66 s. A value "66" is stored in the memory chip 36.

In the embodiment, since the determination of a temperature-rise time period in the production process of the heating device 40 removable from the image forming apparatus has been described above as an example, the memory chip 36 is disposed on the surface of the heating device 40. If the heating device 40 is configured to not be removable from the image forming apparatus, the image forming apparatus may be connected to the temperature-rise measuring device 50, and the production temperature-rise time period tm may be stored in the RAM 73 of the controller 70.

(2) Power Detection Sequence

Figure 7:
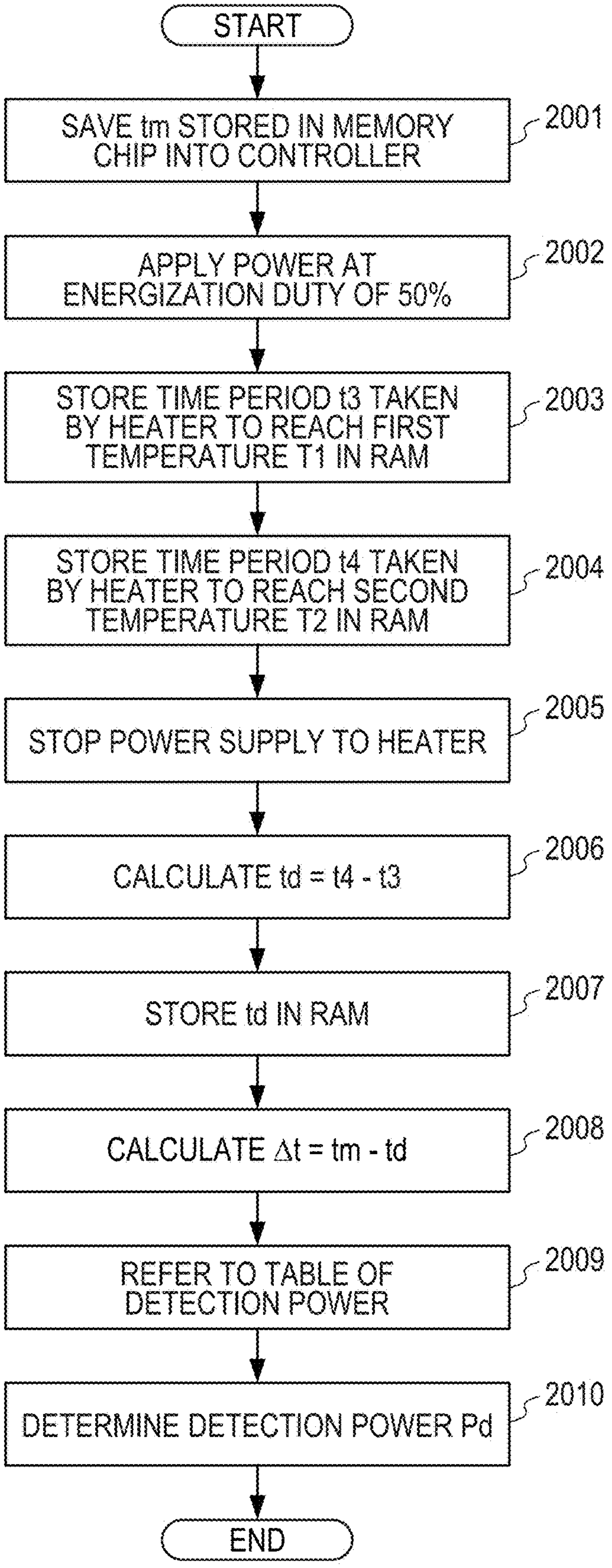
FIG. 7 is a flowchart of a power detection sequence.
Figure 8A:
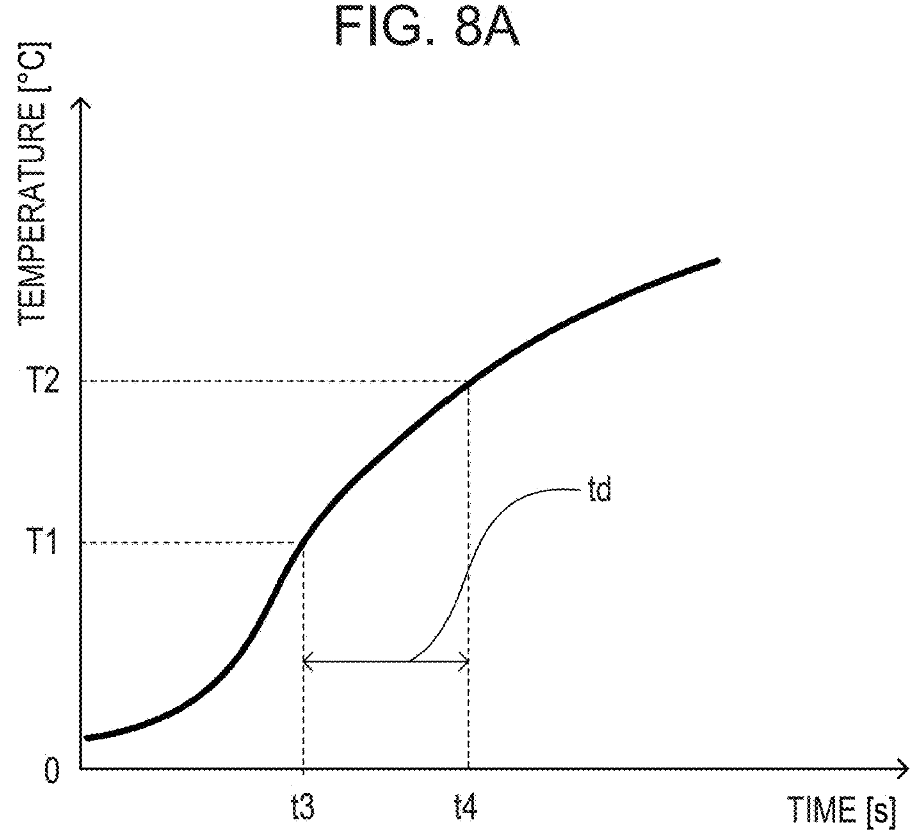
FIGS. 8A and 8B illustrate a temperature rise curve in the determination of a power-detection temperature-rise time period and an energization duty corresponding to the temperature rise curve, respectively.
Figure 8B:
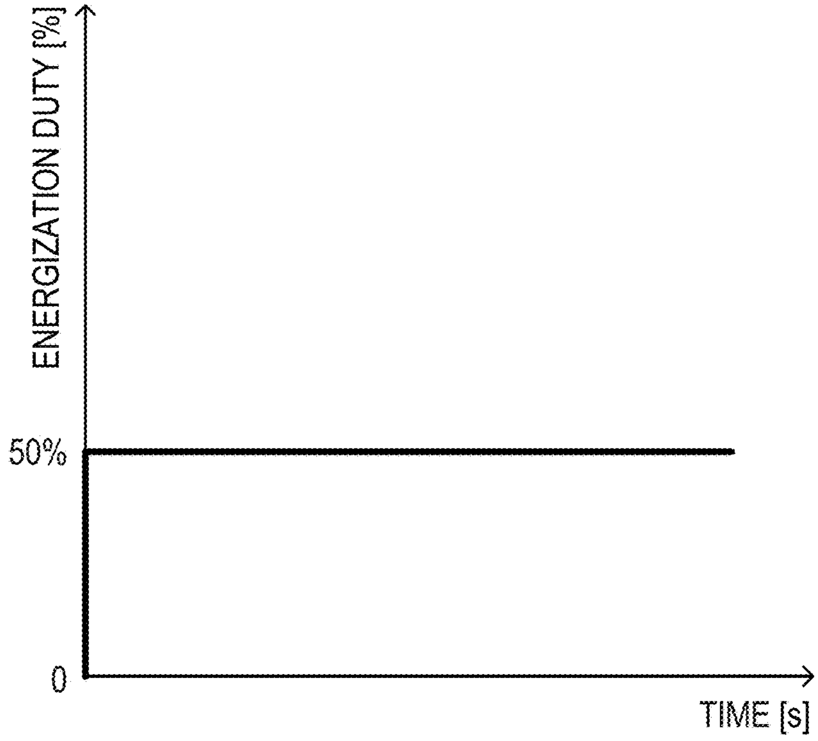

A power detection sequence including determining a temperature-rise time period on a user installation site will now be described. FIG. 7 illustrates a flowchart of the power detection sequence. FIG. 8A illustrates a temperature rise curve of the thermistor Th in the power detection sequence. FIG. 8B illustrates an energization duty (energization rate) corresponding to the temperature rise curve of FIG. 8A. The energization duty is the rate of time during which the heater 42 is energized with an AC voltage from the AC power supply 80 per unit time. The energization duty indicates the percentage of an effective voltage (average voltage) of a voltage waveform applied to the heater 42 to the voltage of the AC power supply 80. In phase control, the energization rate refers to the ratio of a time period of energizing the heater 42 with the triac turned on to the half cycle of the voltage waveform of the AC power supply 80. In controlling turn-on and turn-off of the triac in units of half-waves of the voltage waveform of the AC power supply 80 (wave number control), the energization rate refers to the ratio of the number of half-waves corresponding to turn-on of the triac to the number of half-waves corresponding to one cycle of a cyclic pattern of turn-on and turn-off.

In Step 2001, the contact connector 74 in the image forming apparatus is electrically connected to the memory chip 36 on the surface of the heating device 40, and the production temperature-rise time period tm stored in the memory chip 36 is read into the RAM 73 of the controller 70. In Step 2002, while rotation of the pressure roller 45 is stopped, power W2 at an energization duty of 50% is applied to the heater 42. In response to the power applied to the heater 42, the heater 42 starts to rise in temperature. The CPU 71 uses the thermistor Th and stores, in the RAM 73, a time period t3 taken by the heater 42 to reach the first temperature T1 [° C.] after the start of power application and a time period t4 taken by the heater 42 to reach the second temperature T2 [° C.] higher than the first temperature T1 [° C.], in Steps 2003 and 2004. After a temperature detected by the thermistor Th reaches the second temperature T2 [° C.], the power supply to the heater 42 is stopped in Step 2005. In Step 2006, the controller 70 calculates a power-detection temperature-rise time period td (td=t4−t3) based on the time periods t3 and t4 stored in the RAM 73 (Step 2006) and stores the calculated time period td in the RAM 73 (Step 2007). The controller 70 calculates a temperature-rise time period difference Δt (Δt=tm−td) (Step 2008), checks the temperature-rise time period difference Δt against a table of detection power Pd stored in the ROM 72 (Step 2009) to determine detection power Pd (Step 2010), and stores the detection power Pd in the RAM 73. In the embodiment, the detection power Pd is example maximum power allowed to be supplied to the heater 42. FIG. 9 illustrates an example of a table of detection power Pd showing the relationship between the temperature-rise time period differences Δt multiplied by 100 and maximum power levels Pw. The table of detection power Pd is obtained in advance by determining temperature-rise time period differences Δt at different maximum power levels Pw with a typical heating device 40 and tabulating the relationship between the temperature-rise time period differences Δt and the maximum power levels Pw. The table of detection power Pd is stored in the ROM 72 of the controller 70.

In the embodiment, since the AC voltage is 100 V and the resistance of the heater 42 is 9.22Ω, the maximum power Pw is 1000 W, as described above. Since the energization rate is 50%, power W2 to be supplied to the heater 42 for determination of the power-detection temperature-rise time period td is set to 500 W. Power W1 to be supplied to the heater 42 for determination of the production temperature-rise time period tm is also set to 500 W. The first temperature T1 [° C.] and the second temperature T2 [° C.] used to determine a power-detection temperature-rise time period are the same as those used to determine a production temperature-rise time period. The first temperature T1 is set to 45° C., and the second temperature T2 is set to 65° C.

Since the energization rate is set to 50%, the power W2 to be supplied for determination of a temperature-rise time period upon installation is 500 W, as long as the resistance of the heater is 9.22Ω and the AC voltage is 100 V. Since the power supplied during production is equal to the power supplied upon installation, the production temperature-rise time period tm is equal to the power-detection temperature-rise time period td. Thus, the temperature-rise time period difference Δt is equal to 0.

Figure 10:
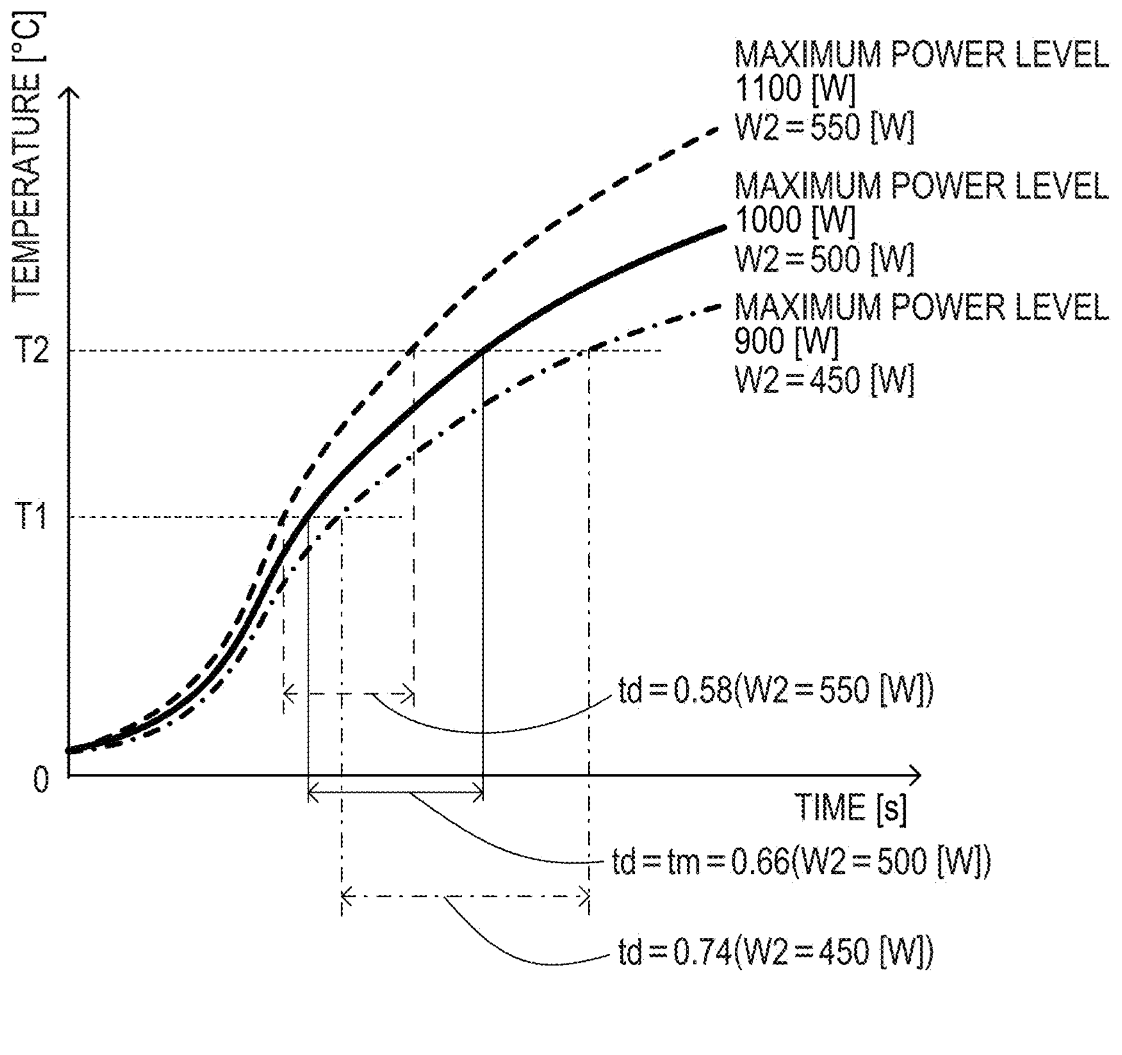
FIG. 10 illustrates temperature rise curves in determination of power-detection temperature-rise time periods at different maximum power levels.

Factors changing the temperature-rise time period difference Δt include variations in the AC voltage and a change in resistance of the heater caused by energization deterioration. Variations in the AC voltage result in variations in the maximum power Pw, leading to variations in the power W2 supplied for determination of a power-detection temperature-rise time period. This causes a difference between the production temperature-rise time period tm and the power-detection temperature-rise time period td. The temperature-rise time period difference Δt is not equal to 0. In a case where the AC voltage is constant but the resistance of the heater changes due to deterioration in durability, similarly, the temperature-rise time period difference Δt is not equal to 0. FIG. 10 illustrates temperature rise curves while determining power-detection temperature-rise time periods at maximum power levels Pw of 1000 W, 1100 W, and 900 W. The levels of power W2 supplied for determination of a power-detection temperature-rise time period in those cases are 500 W, 550 W, and 450 W. In a case where the resistance of the heater is lower than 9.22Ω, which is the initial value, or alternatively, in a case where the AC power supply voltage is higher than 100 V, the maximum power Pw exceeds 1000 W. For example, in a case where the maximum power Pw is 1100 W, the power W2 for determination of the power-detection temperature-rise time period is 550 W. In this case, the power-detection temperature-rise time period td=0.58 [s]. Since the production temperature-rise time period tm=0.66 [s], Δt (=tm−td)=0.08 [s]. In a case where the resistance of the heater is higher than 9.22Ω, which is the initial value, or alternatively, in a case where the AC power supply voltage is lower than 100 V, the maximum power Pw is below 1000 W. For example, in a case where the maximum power Pw is 900 W, the power W2 for determination of the power-detection temperature-rise time period is 450 W.

In this case, the power-detection temperature-rise time period td=0.74 [s]. Thus, Δt (=tm−td)=−0.08 [s]. Maximum power allowed to be supplied to the heater 42 can be estimated by checking these differences Δt against the table of detection power Pd.

As described above, the power detection sequence in the embodiment features comparison between the production temperature-rise time period tm determined in advance at predetermined power in the production process of a fixing device (heating device) and the power-detection temperature-rise time period td determined for power detection in the same fixing device. The components of the heating devices 40 have variations in their characteristics and dimensions. Such variations affect temperature-rise time periods. However, comparison between temperature-rise time periods with respect to the same fixing device is not affected by variations between the components. This allows accurate estimation of detection power Pd.

Temperature rise measurement in the power detection sequence with the pressure roller 45 driven is significantly affected by heat dissipation from the rotating pressure roller 45 to its surrounding atmosphere. A thin thickness of the fixing film 41 or a large width of the nip portion N causes heat from the heater 42 to easily transfer to the pressure roller, causing the heater 42 to slowly rise in temperature. Therefore, a reduction in thickness of the fixing film 41 resulting from deterioration in durability or an increase in width of the nip portion N caused by a reduction in hardness of the pressure roller resulting from deterioration in durability leads to slow temperature rise, thus affecting the accuracy of power detection. In the embodiment, a temperature-rise time period is determined in heating with the pressure roller 45 in the stopped state, or a stop-state heating mode. In the stop-state heating mode, heat from the heater 42 through the fixing film 41 remains at the nip portion N, and temperature rise measurement is substantially unaffected by heat dissipation to the outside. Therefore, the temperature rise curve of the heater 42 is determined by power supplied to the heater 42 and is less sensitive to variations in thickness of the fixing film 41 and variations in width of the nip portion N. This stabilizes the accuracy of power detection under deterioration in durability.

For higher accuracy of the power detection sequence, the power-detection temperature-rise time period td can vary depending on maximum power. It is therefore necessary to increase the energization duty so that the power W2 to be supplied for power detection increases or to increase the difference between the first temperature T1 [C] and the second temperature T2 [° C.] so that the power-detection temperature-rise time period td is prolonged. In temperature rise measurement in the stop-state heating mode, only the nip portion N defined by the fixing film 41 and the pressure roller 45 rises in temperature. A higher energization duty results in a larger rise in temperature of the nip portion N defined by the fixing film 41 and the pressure roller 45, increasing a difference in temperature between the nip portion N and the other portions. In a case where the power detection sequence is performed upon start-up of the heater at the start of printing, only the nip portion defined by the fixing film 41 and the pressure roller 45 rises in temperature in the stop-state heating mode. Such a rise in temperature appears as a temperature ripple in heater temperature control through the thermistor Th. A large temperature ripple may cause unstable fixing-temperature control. For the quality of a fixed image, such a large temperature ripple may cause unevenness in heat quantity, leading to uneven gloss of the fixed image.

A large difference between the first temperature T1 and the second temperature T2 prolongs the time taken to perform the power detection sequence. If the power detection sequence were performed in a printing operation, the prolonged time would affect a first print out time (FPOT), which is the time it takes to produce the first page after the start of printing. To increase the accuracy of the power detection sequence in the embodiment without affecting the image quality and the FPOT, therefore, the power detection sequence can be performed at the following timing: when the image forming apparatus is turned on; or when the image forming apparatus returns from a power-saving mode.

In the embodiment, the production temperature-rise time period and the power-detection temperature-rise time period are determined using the first temperature T1 and the second temperature T2, and the detection power Pd is estimated based on comparison between those time periods. Temperature-rise time periods do not need to be measured as long as any other measurement in the production process can be compared with that for power detection. For example, the amount of rise in temperature for a predetermined time period from first timing to second timing after the start of energization of the heater 42 in the production process may be compared with that for power detection.

<Supply Power Correction>

Figure 11:
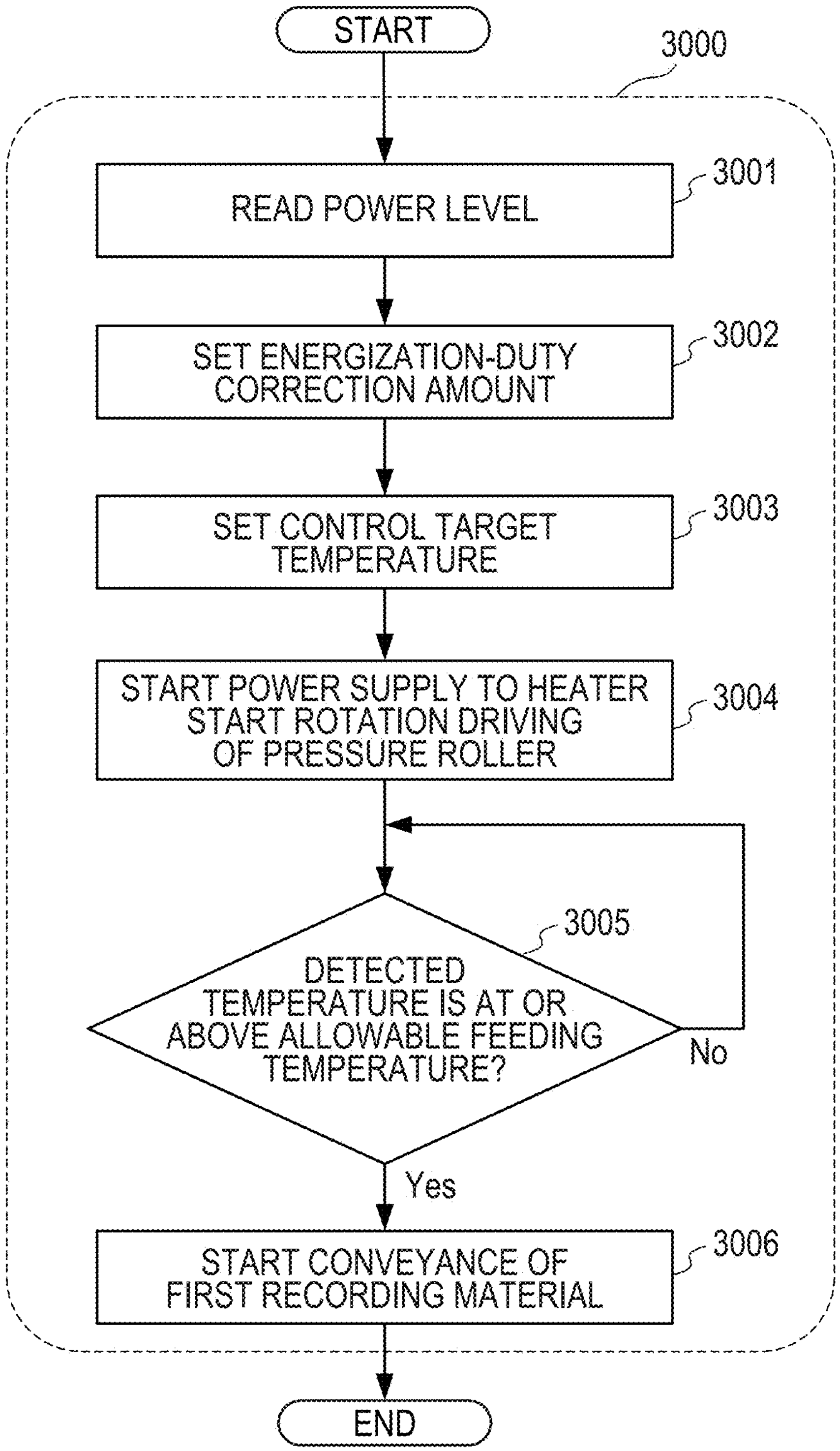
FIG. 11 is a flowchart of start-up control in an embodiment.

A method of correcting the energization duty after determination of the detection power Pd in the power detection sequence will now be described. An operation for correcting power to be supplied to the heater in the embodiment will be described with reference to a flowchart of FIG. 11.

In response to receiving a print signal, the image forming apparatus starts a fixing device start-up sequence 3000. The fixing device start-up sequence 3000 is a sequence of heating the heating device 40 to a temperature suitable for a fixing operation.

In the fixing device start-up sequence 3000, in Step 3001 the detection power Pd determined in the power detection sequence is read from the RAM 73. Then, an energization-duty correction-amount reference value set in advance and stored in the ROM 72 is read. In the embodiment, the energization-duty correction-amount reference value is 1.00.

In Step 3002, the controller 70 sets a correction amount based on the detection power Pd for the reference value. Correction based on the detection power Pd determined in the power detection sequence will be described in detail later.

In Step 3003, a control target temperature in the fixing device start-up sequence is set. To set the control target temperature, the controller 70 reads a control-target-temperature reference value stored in the ROM 72 and set in advance for each print mode. The controller 70 corrects the reference value based on information on the temperature (environmental temperature) of a place where the image forming apparatus is installed, thus determining a control target temperature for the fixing device start-up sequence. At low environmental temperatures, a recording material also has a low temperature. Therefore, a greater quantity of heat is used to fix an unfixed toner image to the recording material. For this reason, correction is performed to increase the control target temperature for lower environmental temperatures.

A temperature sensor may be mounted in the image forming apparatus. The environmental temperature is estimated based on a value of the temperature sensor.

After the control target temperature is set in Step 3003, rotation driving of the pressure roller 45 is started, and power supply to the heater 42 is simultaneously started in Step 3004, so that the heating device 40 starts heating. In Step 3005, a determination is made of whether a temperature detected by the thermistor Th reaches or exceeds an allowable feeding temperature. If not, the detection of Step 3005 is repeated. If so, conveyance of the first recording material 11 from the feed tray 12 is started in Step 3006. The fixing device start-up sequence 3000 is then terminated.

<Correction for Energization Duty of Heating Device>

The maximum power Pw and temperature control will be described with reference to FIGS. 12A and 12B. In the heating device 40, power is supplied to the electrode portions 405*a* and 405*b* of the heater 42 from the controller 70 connected to the AC power supply 80, so that the resistance heating layer 402 of the heater 42 generates heat. The controller 70 controls energization of the heater 42 with the triac included in the controller 70 based on information on the temperature of the heater 42 outputted from the thermistor Th, thus controlling the temperature of the heater 42. In temperature control in the embodiment, an energization duty based on predetermined proportional integral (PI) control is set based on the difference between the current temperature outputted from the thermistor Th and the target temperature.

In the PI control, the P value and the I value are set so that temperature control is most stable when the maximum power Pw for the heating device 40 is at 1000 W, as reference power P0.

Figure 12A:
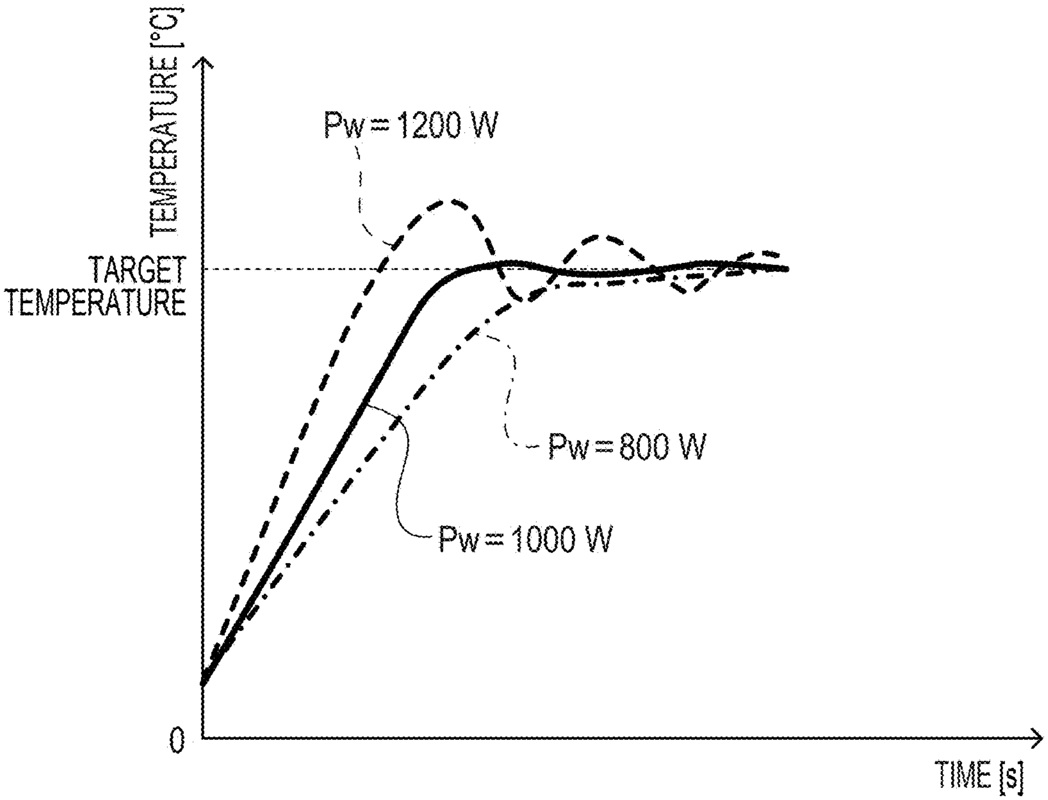
FIGS. 12A and 12B illustrate start-up temperature curves in a comparative example and energization duties corresponding to the start-up temperature curves, respectively.

FIG. 12A shows temperature curves of the thermistor Th without correction for the energization duty in the same heating device 40 at maximum power levels Pw of 1000 W, 1200 W, and 800 W set by changing the voltage of the AC power supply 80. A solid line is a temperature curve obtained at a maximum power level Pw of 1000 W for the heating device 40. A broken line is a temperature curve obtained at a maximum power level Pw of 1200 W. An alternate long and short dash line is a temperature curve obtained at a maximum power level Pw of 800 W.

Figure 12B:
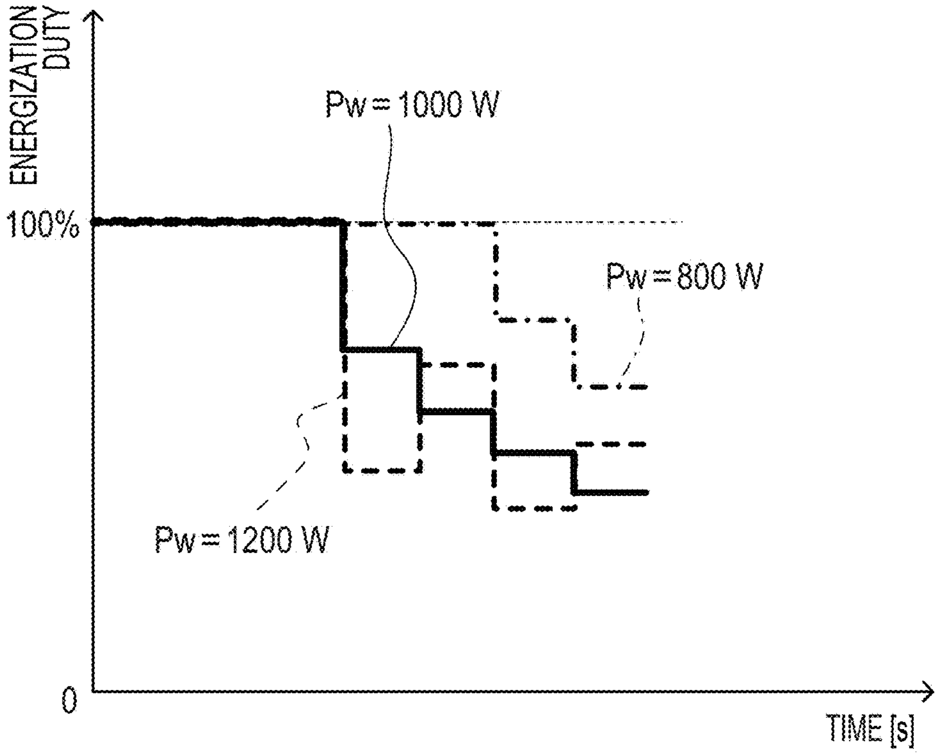

FIG. 12B shows changes in energization duties corresponding to the start-up temperature curves of FIG. 12A.

In the case where the maximum power Pw is 1000 W, which is the reference power P0, when the difference between the target temperature and the temperature of the thermistor Th is large at initial start-up, the energization duty is set to 100%. As the difference between the target temperature and the temperature of the thermistor Th decreases, the energization duty is reduced.

Thus, the temperature of the thermistor Th is stabilized at the target temperature.

In the case where the maximum power Pw is 1200 W, since the PI control is optimized for 1000 W, which is the reference power P0, energization is controlled at the same energization duty as that for 1000 W, so that the temperature of the thermistor Th significantly overshoots the target temperature. Once the degree of overshoot increases, the energization duty is reduced to lower the temperature of the thermistor Th, leading to undershoot relative to the target temperature. After that, the temperature of the thermistor Th gradually approaches the target temperature while repeating overshooting and undershooting the target temperature.

In the case where the maximum power Pw is 800 W, when the difference between the target temperature and the temperature of the thermistor Th decreases, energization is controlled at the same energization duty as that for 1000 W, which is the reference power P0. Therefore, the energization duty is reduced although the energization duty actually needs to be maintained high. Thus, it takes long time for the thermistor Th to reach the target temperature.

In other words, since the PI control is optimized for 1000 W as the reference power P0, if the maximum power Pw differs from 1000 W, it is difficult to stabilize the temperature of the thermistor Th relative to the target temperature. In the embodiment, an energization-duty correction amount A that allows the energization rate to change depending on the detection power Pd determined in the power detection sequence is determined by using Equation (1):

$$A = P0/Pd, \tag{1}$$

where P0 is a reference maximum power and Pd is the detection power estimated in the power detection sequence.

In the embodiment, the reference maximum power P0 is 1000 W. An energization duty X [%] in a reference state calculated through the PI control is corrected with the correction amount A, given by Equation (1), by using Equation (2):

$$\text{Energization duty} = X \times A \tag{2}$$

The energization duty is corrected such that an energization duty lower than that in the reference state for 1000 W is selected for a higher detection power level Pd and such that an energization duty higher than that in the reference state for 1000 W is selected for a lower detection power level Pd. The corrected energization duty causes controlled power to be equal to 1000 W, which is the reference power P0. Thus, the temperature of the thermistor Th can be quickly stabilized at the target temperature upon start-up.

The following experiment was conducted to confirm advantages of the power detection sequence and those of the energization duty correction in the embodiment. Experimental conditions were as follows. The recording-material conveying speed was 222 mm/s, the print speed (throughput) was 38 ppm, the recording materials were A4 sheets "Red Label" available from Canon Production Printing Holding B.V. and having a basis weight of 80 g/m$^2$. A fixing reference temperature Ta for the sheets "Red Label" was 180° C.

Comparative experiment can be conducted in an environment managed under constant temperature and humidity conditions provided through air conditioning by an air conditioner or the like. In the embodiment, the comparative experiment was conducted in an environment with a temperature of 23° C. and relative humidity of 50%.

For comparison, the presence or absence of defective fixing on the first to fifth sheets was determined under conditions where consecutive printing was performed after the heating device 40 was heated from a state at a room temperature of 23° C.

Specifically, AC voltages of 100 V, 110 V, and 90 V were used, and the power detection sequence was performed upon turn-on of the apparatus at each of those AC voltages. The energization-duty correction amount A was determined based on the detection power Pd determined in the power detection sequence. The fixability of images on the first to fifth sheets under control conditions at the corrected energization duty was checked. Results are summarized in FIG. 13.

In a comparative example, the power detection sequence was not performed, and the energization duty was not corrected. The fixability of images on the first to fifth sheets under these conditions at AC voltages of 100 V, 110 V, and 90 V was checked.

In the image forming apparatus according to the embodiment, at an AC voltage of 100 V, the detection power Pd determined in the power detection sequence was 1000 W. The energization-duty correction amount A in this case was 1.00. For the fixability on the first to fifth sheets passed in this state, neither defective fixing resulting from an insufficient quantity of heat nor hot offset resulting from excessive fixing occurred. At an AC voltage of 110 V, the detection power Pd determined in the power detection sequence was 1225 W. The energization-duty correction amount A in this case was 0.82. The fixability on the first to fifth sheets passed in this state was also not particularly problematic. At an AC voltage of 90 V, the detection power Pd determined in the power detection sequence was 805 W. The energization-duty correction amount A in this case was 1.24. The fixability on the first to fifth sheets passed in this state was also not particularly problematic. The reason is as follows. Although the maximum power Pw changes depending on the AC voltage, the energization duty is corrected so that regulated power is equal to 1000 W, which is the reference power P0. Thus, the temperature of the thermistor Th can quickly converge to the target temperature upon start-up.

In the comparative example, at an AC voltage of 100 V, maximum power was equal to 1000 W, which is the reference power P0. The operation was the same as that at 100 V in the embodiment. For the fixability of images on the first to fifth sheets, therefore, neither defective fixing resulting from an insufficient quantity of heat nor hot offset resulting from excessive fixing occurred. At an AC voltage of 110 V, overshoot and undershoot occurred in a manner similar to those in the start-up temperature curve at 1200 W in FIG. 12A. Both hot offset and defective fixing occurred on the first to fifth sheets. At an AC voltage of 90 V, defective fixing occurred because a state in which the temperature of the thermistor Th did not reach the target temperature continued in a manner similar to that in the start-up temperature curve at 800 W in FIG. 12A.

As described above, the power detection sequence and the energization-duty correction in the embodiment allow controlled power to be equal to the reference power, thus stabilizing the start-up temperature curve. This prevents defective fixing and hot offset.

Next, experiment was conducted to confirm a change in detection power Pd, determined in the power detection sequence in the embodiment, depending on durability. In this experiment, passing of 200,000 sheets corresponding to the lifetime of the heating device was performed to compare detection power levels Pd determined in the power detection sequences in a step-by-step manner from an initial stage. The thickness of the fixing-film release layer, the nip width, and the resistance of the heater were also measured. Results are summarized in FIG. 14. Although the thickness of the fixing-film release layer was 20 μm at the initial stage, the thickness changed to 15 μm upon passing of 100,000 sheets and then changed to 11 μm upon passing of 200,000 sheets. As shown in FIG. 14, the release layer gradually wore due to durability deterioration caused by sheet passing. Although the nip width was 9.0 mm at the initial stage, the nip width changed to 9.4 mm upon passing of 100,000 sheets and then changed to 9.6 mm upon passing of 200,000 sheets. The hardness of the pressure roller decreased due to durability deterioration caused by sheet passing, so that the nip width gradually increased. Although the resistance of the heater was 9.1Ω at the initial stage, the resistance changed to 9.23Ω upon passing of 100,000 sheets and then changed to 9.35 (2 upon passing of 200,000 sheets due to energization deterioration. Since the AC voltage was 100 V during the experiment, the maximum power Pw was 1013 W at the initial stage, changed to 998 W upon passing of 100,000 sheets, and then changed to 986 W upon passing of 200,000 sheets. The detection power Pd determined in the power detection sequence was 1015 W at the initial stage, changed to 1000 W upon passing of 100,000 sheets, and then changed to 985 W upon passing of 200,000 sheets. These values substantially agree with the maximum power levels Pw. The reason is as follows. In the embodiment, the power detection sequence performed in the stop-state heating mode is less sensitive to a change in thickness of the release layer of the fixing film 41 and a change in width of the nip portion. Detection power is determined based on maximum power supplied to the heater. Additionally, the increase in resistance of the heater and the decrease in maximum power due to energization deterioration caused by durability deterioration were also successfully detected in the power detection sequence.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a CPU, micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a RAM, a ROM, a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-038810, filed Mar. 13, 2024, which is hereby incorporated by reference herein in its entirety.

What is claimed is:

1. An image forming apparatus comprising:

an image forming unit configured to form an image on a recording material;

a fixing device configured to fix the image formed on the recording material to the recording material, the fixing device including:

a fixing member, a heating member configured to heat the fixing member, a temperature detection unit configured to detect a temperature of the heating member, and a pressure member facing the heating member with the fixing member interposed between the pressure member and the heating member;

a control unit configured to control a rate of energizing the heating member to raise the temperature detected by the temperature detection unit to a target temperature; and a storage unit configured to store temperature-rise time period information of the temperature detection unit, wherein the control unit is further configured to:

determine a temperature-rise time period of temperature detected by the temperature detection unit while energizing the heating member at a predetermined energization rate, compare the determined temperature-rise time period with temperature-rise time period information stored in the storage unit, estimate maximum power to be supplied to the heating member based on the compared information, and modify, based on the estimated maximum power, the rate of energizing the heating member.

2. The image forming apparatus according to claim 1, wherein the temperature-rise time period information stored in the storage unit indicates a time period from detection of a first temperature by the temperature detection unit to detection of a second temperature higher than the first temperature by the temperature detection unit during production of the fixing device.

3. The image forming apparatus according to claim 1, wherein the control unit is further configured to determine a time period from detection of a first temperature by the temperature detection unit to detection of a second temperature higher than the first temperature by the temperature detection unit.

4. The image forming apparatus according to claim 1, wherein the storage unit is configured as a memory chip disposed on a portion of a surface of the fixing device.

5. The image forming apparatus according to claim 1, wherein the control unit is further configured to determine the temperature-rise time period when the image forming apparatus is turned on or when the image forming apparatus returns from a power-saving mode.

6. The image forming apparatus according to claim 1, wherein the control unit is further configured to control power supplied to the heating member to cause the temperature detected by the temperature detection unit to reach the target temperature using an energization rate multiplied by a reference maximum power divided by the estimated maximum power.

7. The image forming apparatus according to claim 1, wherein:

the fixing member is configured as a cylindrical film, the heating member is disposed in an internal space of the cylindrical film and includes a resistance heating element configured to generate heat when energized, the pressure member is configured as a roller, and the fixing device is configured to heat the image by conduction of heat from the heating member while the recording material is nipped and conveyed at a nip portion defined by the heating member and the pressure member, and the temperature-rise time period of temperature detected by the temperature detection unit while energizing the heating member at a predetermined energization rate is determined in a state in which the pressure member does not rotate.

8. An image forming apparatus comprising:

an image forming unit configured to form an image on a recording material;

a fixing device configured to fix the image formed on the recording material to the recording material, the fixing device including a fixing member, a heating member configured to heat the fixing member, a temperature detection unit configured to detect a temperature of the heating member, and a pressure member facing the heating member with the fixing member interposed between the pressure member and the heating member;

a control unit configured to control a rate of energizing the heating member to raise the temperature detected by the temperature detection unit to a target temperature; and a storage unit configured to store at least one temperature detected by the temperature detection unit, wherein the control unit is further configured to:

determine a rise in temperature detected by the temperature detection unit while energizing the heating member at a predetermined energization rate, compare the determined rise in temperature with information stored in the storage unit, estimate maximum power to be supplied to the heating member, and modify the rate of energizing the heating member based on the estimated maximum power.

9. The image forming apparatus according to claim 8, wherein the information stored in the storage unit indicates a rise in temperature detected by the temperature detection unit from a start of energization of the heating member to a predetermined time during production of the fixing device.

10. The image forming apparatus according to claim 8, wherein the control unit is further configured to determine a rise in temperature detected by the temperature detection unit from a start of energization of the heating member to a predetermined time.

11. The image forming apparatus according to claim 8, wherein the storage unit is configured as a memory chip disposed on a portion of a surface of the fixing device.

12. The image forming apparatus according to claim 8, wherein the control unit is further configured to determine the rise in temperature when the image forming apparatus is turned on or when the image forming apparatus returns from a power-saving mode.

13. The image forming apparatus according to claim 8, wherein the control unit is further configured to control power supplied to the heating member to cause the temperature detected by the temperature detection unit to reach the target temperature using an energization rate multiplied by a reference maximum power divided by the estimated maximum power.

14. The image forming apparatus according to claim 8, wherein:

the fixing member is configured as a cylindrical film, the heating member is disposed in an internal space of the cylindrical film and includes a resistance heating element configured to generate heat when energized, the pressure member is configured as a roller, and the fixing device is configured to heat the image by conduction of heat from the heating member while the recording material is nipped and conveyed at a nip portion defined by the heating member and the pressure member, and the rise in temperature is detected by the temperature detection unit while the pressure member does not rotate.

15. A method of controlling an image forming apparatus, the method comprising:

storing, in a memory, at least one temperature-rise time period for estimating a maximum power to be supplied to a fixing device that includes a fixing member, a heating member configured to heat the fixing member, and a temperature detector configured to detect a temperature of the heating member, fixing, by the fixing device, an image;

heating the fixing device until the temperature detector detects a target temperature;

determining, during the heating, a rise in temperature during at least one period;

comparing the determined rise in temperature during the at least one period with the stored at least one temperature-rise time period; and correcting, based on the comparison, a rate of heating the fixing device.

16. The method of claim 15, wherein the fixing device includes a pressure member.

17. The method of claim 16, wherein the rise in temperature is determined at a predetermined energization rate with the pressure member in a non-rotating state.

18. The method of claim 16, wherein the fixing member is interposed between the pressure member and the heating member.

* * * * *